US008496878B2

(12) United States Patent
Jakubowicz et al.

(10) Patent No.: US 8,496,878 B2
(45) **Date of Patent: *Jul. 30, 2013**

(54) DILUENT WELLS PRODUCED IN CARD FORMAT FOR IMMUNODIAGNOSTIC TESTING

(75) Inventors: Raymond Francis Jakubowicz, Rush, NY (US); William G. Atterbury, Columbus, OH (US); Douglas E. Boyd, Dublin, OH (US); Michael L. Marshall, Powell, OH (US)

(73) Assignee: Ortho-Clinical Diagnostics, Inc., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/481,301

(22) Filed: May 25, 2012

(65) Prior Publication Data

US 2012/0238034 A1 Sep. 20, 2012

Related U.S. Application Data

(62) Division of application No. 12/015,936, filed on Jan. 17, 2008, now Pat. No. 8,187,538.

(51) Int. Cl.
*G01N 1/38* (2006.01)

(52) U.S. Cl.
USPC ............. 422/68.1; 422/73; 436/179; 436/807

(58) Field of Classification Search
USPC ............................ 422/68.1, 73; 436/179, 807
See application file for complete search history.

(56) References Cited

U.S. PATENT DOCUMENTS

| | | | | |
|---|---|---|---|---|
| 3,441,383 | A | | 4/1969 | Moore et al. |
| 3,713,985 | A | | 1/1973 | Astle |
| 4,055,394 | A | | 10/1977 | Friedman et al. |
| 4,305,721 | A | | 12/1981 | Bernstein |
| 4,675,299 | A | | 6/1987 | Witty et al. |
| 4,719,087 | A | | 1/1988 | Hanaway |
| 4,871,682 | A | | 10/1989 | Mazza |
| 5,141,718 | A | | 8/1992 | Clark |
| 5,147,609 | A | | 9/1992 | Grenner |
| 5,184,634 | A | | 2/1993 | Kitajima |
| 5,338,669 | A | | 8/1994 | Gillies |
| 5,439,826 | A | | 8/1995 | Kontorovich |
| 5,460,940 | A | * | 10/1995 | Yves et al. ......................... 435/5 |

(Continued)

FOREIGN PATENT DOCUMENTS

| | | | |
|---|---|---|---|
| EP | 0 100 663 | A2 | 2/1984 |
| EP | 0 918 221 | A2 | 5/1999 |

(Continued)

OTHER PUBLICATIONS

European Search Report and Opinion for EP Application No. 09 25 0121.2; mailed May 25, 2009; 4 pages.

(Continued)

*Primary Examiner* — Jill Warden
*Assistant Examiner* — Monique Cole
(74) *Attorney, Agent, or Firm* — Hiscock & Barclay, LLP

(57) ABSTRACT

An immunodiagnostic test card includes a flat planar member and at least one dilution chamber that is supported by the flat planar member. The at least one dilution chamber can be disposed adjacent chambers used for testing a patient sample that are provided on the immunodiagnostic test card or can be provided separately.

11 Claims, 2 Drawing Sheets

U.S. PATENT DOCUMENTS

| | | | | |
|---|---|---|---|---|
| 5,512,432 | A | 4/1996 | Lapierre et al. | |
| 5,552,064 | A | 9/1996 | Chachowski et al. | |
| 5,723,092 | A | 3/1998 | Babson | |
| 5,912,134 | A | 6/1999 | Shartle | |
| 6,114,179 | A | 9/2000 | Lapierre et al. | |
| 6,180,065 | B1 | 1/2001 | Homola | |
| D445,907 | S | 7/2001 | Monks | |
| D482,454 | S | 11/2003 | Gebrian | |
| 8,187,538 | B2 * | 5/2012 | Jakubowicz et al. | 422/68.1 |
| 2002/0110487 | A1 | 8/2002 | Samsoondar | |
| 2003/0026738 | A1 | 2/2003 | Everett | |
| 2003/0113235 | A1 | 6/2003 | Yokoi et al. | |
| 2005/0282293 | A1 | 12/2005 | Cosman et al. | |
| 2006/0013740 | A1 | 1/2006 | Berndtsson et al. | |
| 2006/0183217 | A1 | 8/2006 | Yanagida et al. | |

FOREIGN PATENT DOCUMENTS

| | | |
|---|---|---|
| JP | 01-163662 | 6/1989 |
| JP | 03181853 | 8/1991 |
| JP | 2001-318101 | 11/2001 |
| WO | WO 87/04718 | 8/1987 |
| WO | WO 97/37219 | 10/1997 |
| WO | WO 98/36260 | 8/1998 |

OTHER PUBLICATIONS

Japanese Search Report for JP Application No. 2009-007133; mailed Oct. 30, 2012; 4 pages.

* cited by examiner

DILUENT WELLS PRODUCED IN CARD FORMAT FOR IMMUNODIAGNOSTIC TESTING

CROSS REFERENCE TO RELATED APPLICATIONS

This application is a divisional application of U.S. Ser. No. 12/015,936, filed Jan. 17, 2008, the entire contents of which are herein incorporated by reference.

FIELD OF THE INVENTION

The application relates to the field of immunodiagnostic testing, and more specifically to the incorporation of dilution or mixing wells into a disposable immunodiagnostic card format.

BACKGROUND OF THE INVENTION

Current immunohematology diagnostic systems, such as those manufactured by the Johnson and Johnson Company and DiaMed Inc., among others, utilize dilution cups or plates that are provided as extra consumables. For example, a reusable and washable dilution cup is often utilized in conjunction with such apparatus. The use of reusable cups, however, creates a number of issues relating to cleaning, as well as those involving fluidic "carry-over" between various elements of the apparatus. To prevent the latter, dilution cup fluid carry-over has been traditionally resolved by either using additional supplies of cleaning liquid (e.g., water), taking additional time in the handling and care of the dilution cup, and/or the use of a detergent.

Other apparatus have alternatively been provided, such as those described by U.S. Pat. No. 5,184,634, which uses a cleaning apparatus with a water inlet, a separate air inlet, an outlet to discharge water and a sealing member to hermetically seal the dilution cup. Though fluid carry-over is effectively resolved using this apparatus, a relatively complex cleaning apparatus is required.

In other apparatus, such as described in European Publication No. EP 0100663, a spectrophotometer analyzer incorporates a plurality of intermediate (i.e., disposable) dilution cups. An analyzer incorporating this solution therefore requires the additional resources of a tray or other support for the cups as well as means for handling, moving the cups between specific stations in the analyzer, and eventually disposal of the cups. Therefore, this apparatus has the disadvantage of requiring new hardware and software to control the movement and placement of the disposable dilution cups in addition to the issue of having extra consumables that are introduced by the cups themselves.

SUMMARY OF THE INVENTION

According to one aspect, an immunodiagnostic test card is provided that includes a substantially flat planar member and at least one supported dilution chamber wherein the card can be used manually or be handled by an automated analyzer. Preferably, the test card is similar in format to so-called "gel" cards or "bead" cards having uses for immunohematology applications, such as blood typing or blood grouping, among others, but can include literally any substrate capable of retaining at least one chamber. In one embodiment, the at least one dilution or mixing chamber is provided in an immunohematology card having a plurality of test chambers, the test chambers each retaining a suspension of inert particles, such as beads or gel material to which an antigen or antibody is coated or in which an a carrier bound antibody or antigen is added for testing of a patient sample that is added to the test chambers following dilution thereof. In one version, at least one dilution chamber is disposed between adjacent test chambers of a test card. In another version, at least one dilution chamber is provided within a separate card having no test chambers. In either version, a predetermined quantity of patient sample is mixed with a corresponding amount of diluent and the diluted sample is then added to at least one test chamber of the card and subsequently spun to produce an agglutination reaction that is graded based on the position of formed agglutinates in the test column or the lack of agglutination. Accordingly, the at least one dilution chamber can also be used for mixing other fluids, such as reagents.

According to another aspect, there is provided a method for diluting a patient sample prior to immunodiagnostic testing of said sample. The method comprises the steps of providing at least one diluent chamber in an immunodiagnostic test card, said test card including a substantially flat planar member in which said at least one diluent chamber is supported by said substantially flat planar member; adding patient sample to said at least one diluent chamber; mixing said patient sample and said diluent; and withdrawing the diluted patient sample from said diluent chamber for testing thereof.

In one version, the at least one diluent chamber is provided on the same immunodiagnostic test card as the at least one test chamber, said at least one test chamber having therein a quantity of test material for producing an agglutination reaction when said patient sample is added and mixed with said test material. The method includes the additional steps of withdrawing diluted patient sample and adding said diluted sample to said at least one test chamber for testing thereof. The test card is disposable and in one version, the test card on which said at least one diluent chamber is disposed is an immunohematology test card.

According to one version, a foil or other pierceable seal covers both the test chambers as well as the empty or prefilled dilution chambers of the test card. In an automated analyzer apparatus that typically handles so-called immunodiagnostic "gel" cards, the seal is pierced to access the dilution chamber wherein diluent can then be added, as required. Alternatively, a predetermined quantity of diluent can already be pre-filled in each diluent chamber to provide enhanced throughput of the apparatus. The diluent can then be mixed with the patient sample, such as blood, urine, serum, plasma, amniotic fluid, spinal fluid, or other body fluid that can be supported by an immunodiagnostic system. The mixed patient sample is then transferred to a selected test chamber for testing thereof. The dilution chambers can also be used to mix other fluids, for example, reagents.

Advantageously, the incorporation of dilution wells or chambers into a disposable immunodiagnostic test card provides additional functionality to this type of format in that access to the diluted sample for testing is readily provided without having to provide additional hardware or software to the apparatus. In those card versions in which diluent is precontained, the need for having diluent bottles or supplies on board an analyzer apparatus is eliminated. Eliminating this need permits better optimization of the space envelope of such analyzers, as well as also improving inventory management in that users no longer have to deal with replacing depleted dilution bottles, wherein this latter issue might often be encountered in the midst of testing. In addition, no additional consumables, such as dilution cups or microplates, are necessarily required for mixing the diluent and sample together and as a result fluid carry-over issues are effectively minimized. In addition, the dilution wells can be provided in an empty state or can be prefilled so as to enhance overall throughput.

These and other features and advantages will become readily apparent from the following Detailed Description which should be read in conjunction with the accompanying drawings.

DETAILED DESCRIPTION

The following relates to the incorporation of dilution (mixing) wells or chambers that are provided within a test card format, which can be supported, for example, for use by an automated immunodiagnostic apparatus. Though this description relates to specific embodiments involving this form of incorporation, it will be readily apparent that other variations or modifications will be possible that embody the intended inventive aspects, which will be evident to those of sufficient skill; for example, the test cards can also be used for manually conducted testing. In addition, several terms are used throughout in order to provide a suitable frame of reference with regard to the accompanying drawings. These terms are not intended to be limiting of the claims, except in those instances where so specifically indicated.

Figure 1:
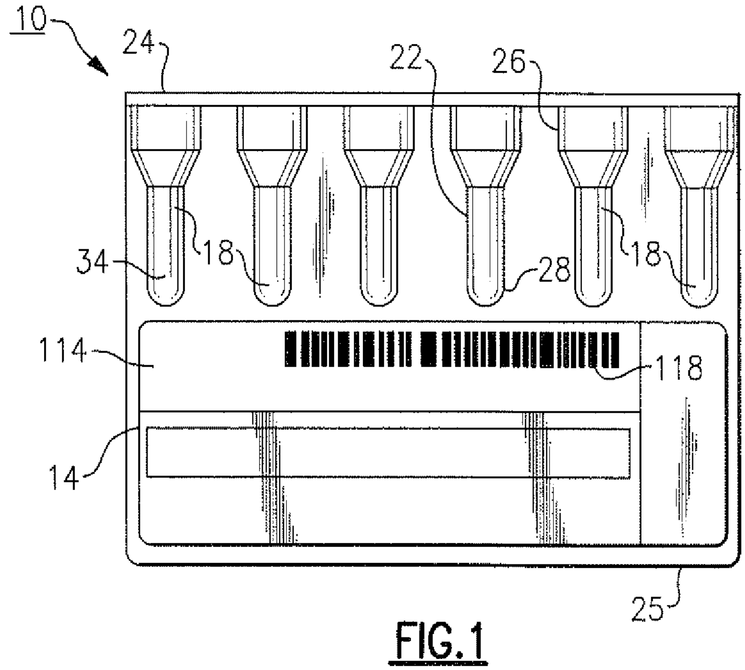
FIG.1 Prior Art
FIG. 1 is a front view of a prior art immunodiagnostic test card.

Referring to FIG. 1 and in order to provide sufficient background, there is depicted a prior art immunodiagnostic test card 10 used for applications, such as, for example, blood typing, blood grouping or antigen or antibody detecting. The test card 10 is defined by a substantially flat planar member 14 that supports a plurality of microtubes 18, each of which are substantially equally spaced from one another and disposed in a predominantly vertical orientation between respective top and bottom sides 24, 25 of the card. Each of the test card 10 and the supported microtubes 18 may be made from a plastic material, such as polyethylene, PVC, polystyrene, or other suitable material wherein the microtubes 18 can be either glued or welded to the test card 10, or according to this embodiment are manufactured integrally with the card, such as through blister packaging. Each of the microtubes 18 is defined by a substantially cylindrical well or column 22 defined by an open upper section 26 having a diameter that is larger than that of a closed lower cylindrical section 28 with a transitional portion having an inwardly tapering diameter disposed between the upper and lower sections. The microtubes 18 are formed from the top side 24 of the test card 10 and extending partially toward the bottom side 25 thereof.

The microtubes 18 according to this embodiment are each configured for immunohematological testing, and to that end further contains a quantity of inert material 34, such as beads made from dextrin acrylamide or similar material or an aqueous gel material that are coated with antigen or antibodies or are provided with a carrier-bound antibody or antigen, this material being disposed in each lower portion 28. Certain examples of inert material used and processing for purposes of immunohematological testing are described in greater detail, for example, in U.S. Pat. Nos. 6,114,179 and 5,552,064, the entire contents of each being herein incorporated by reference. The immunodiagnostic test cards 10 are hermetically sealed wherein the top side 24 of each test card preferably includes a foil or thin film seal (not shown) that covers each of the upper portions 26 of the supported microtubes 18 and can be pierced, using an analyzer (not shown), to selectively access the contents of each microtube and to permit a quantity of patient sample to be added thereto in order to produce an agglutination reaction when mixed by the apparatus, through centrifugation wherein the grade of the reaction can then be determined based on the position of any formed agglutinates or the lack of agglutination. This determination can be made either manually or by machine vision for purposes of blood bank applications including, but not necessarily limited to antibody screening and identification, ABO blood grouping and Rh phenotyping, compatibility testing, reverse serum grouping and antigen testing. An example of a suitable automated apparatus that handles card formats like those described herein is the ProVue® analyzer system manufactured by Ortho-Clinical Diagnostics, Inc. As noted above, additional details relating to the overall design of test cards of this type, such as shown in FIG. 1, and sample processes using same are described in the above cross referenced U.S. Pat. No. 6,114,179, as well as U.S. Pat. Nos. 5,338,669, 5,460,940 and 5,512,432, the contents of each are also incorporated in their entirety by reference herein.

Figure 2:
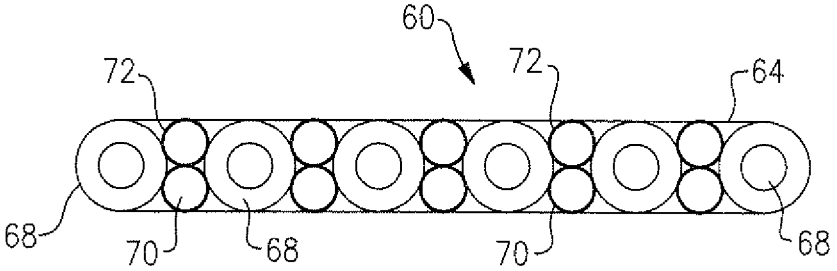
FIG. 2 is a top plan of a immunodiagnostic test card in accordance with a first embodiment.
Figure 3:
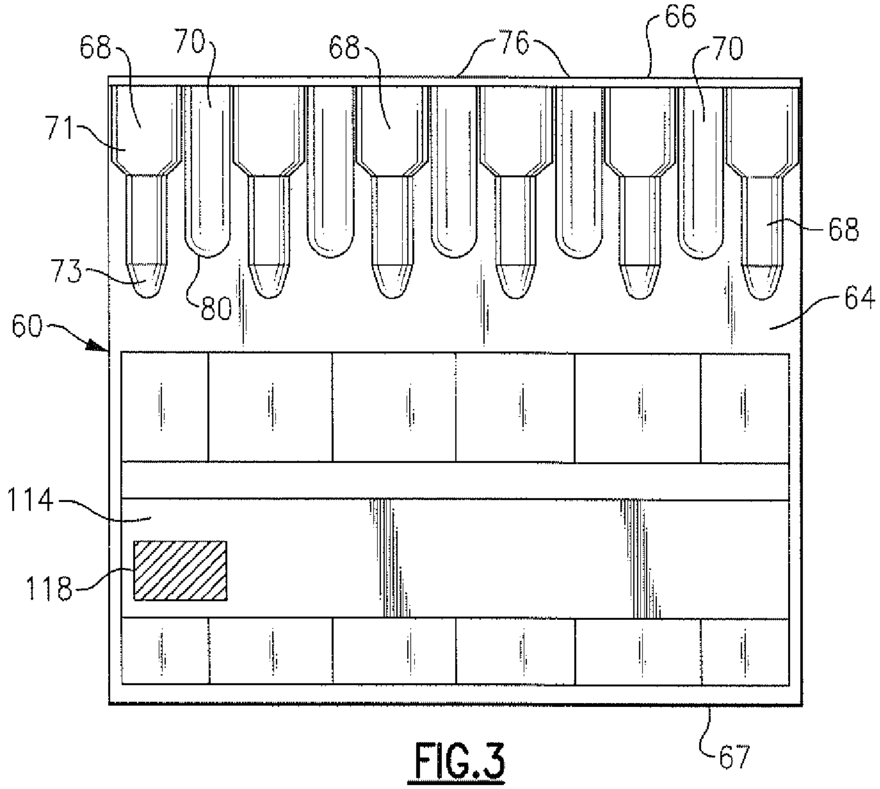
FIG. 3 is a front facing view of the immunodiagnostic test card of FIG. 2.

With the preceding background and referring to FIGS. 2 and 3, there is shown an immunodiagnostic test card 60 made in accordance with a first embodiment. The immunodiagnostic test card 60 is similar to the preceding and defined by a flat planar member 64, as well as a plurality of test chambers 68 that are similarly supported by the planar member, also as previously described and disposed in spaced parallel relation in a substantially vertical orientation. Each of the test chambers 68 according to this embodiment is defined by an open-ended upper cylindrical section 71 having a diameter which is larger than a lower cylindrical section 73, the bottom of the lower cylindrical section being close-ended to define a vertical well-like structure. The chambers 68 as well as the test card 60 can be made from a plastic or other suitable material wherein the test chambers can be integrally formed, such as by blister packaging, or can be glued, welded or otherwise affixed such that they are supported by the planar member 64. As in the preceding and also according to this embodiment, each of the test chambers 68 similarly contain a quantity of an inert material such as beads or gel that may be coated with an antigen or antibody or include a carrier bound antibody or antigen for the testing a patient sample as described in previously incorporated U.S. Pat. Nos. 5,338,669, 5,460,940, 5,512,432, 5,552,064 and 6,114,179.

In addition and according to this embodiment the test card 60 is further modified to incorporate a plurality of dilution chambers that are disposed between adjacent test chambers 68. According to this embodiment, a pair of dilution chambers 70, 72 are each disposed in side by side relation between adjacent test chambers 68, wherein each of the chambers are provided as microtubes. Each of the dilution wells 70, 72 are defined a substantially cylindrical construction having an approximately constant diameter, further defined by an open upper end 76 at the top of the card and a closed lower end 80 that is intermediately provided between respective top and bottom sides 66, 67 of the test card 60. It should be readily apparent that each of the dilution chambers can be constructed with other suitably defined geometries depending upon, for example, the application or use that is required.

Like the test chambers 68, the incorporated dilution chambers 70, 72 can also be glued or welded so as to be supported by the test card 60 or can be manufactured integrally therewith, such as by means of blister packaging. A total of five (5) pairs of dilution chambers 70, 72 constituting ten (10) total dilution chambers are provided between a total of six (6) test chambers 68 in the exemplary test card 60 described herein, although it will be understood that these numbers can easily be varied to suit various applications.

In operation, each of the test chambers 68 are initially filled with test material and the dilution wells 70, 72 are initially empty, as in the present embodiment, or are prefilled with a suitable quantity of diluent liquid such as buffer solution. Suitable test and diluent materials are described by way of example in previously cross referenced U.S. Pat. No. 6,114,179, for purposes of immunohematological testing of blood samples for typing, grouping, antigen and antibody detecting and the like. A plurality of test cards 10 are loaded into a cartridge (not shown) of an automated apparatus (not shown) such as, for example, the afore mentioned ProVue® system manufactured by Ortho-Clinical Diagnostics, Inc. The foil seal of the test card 60 is pierced to introduce a quantity of diluent, such as from external bottles (not shown) that are stored on board the analyzer, to the confines of at least one of the diluent wells 70, 72 of each pair. Patient sample is then added from a collection device (not shown) to the contents of each diluent chamber wherein the contents are incubated and mixed by centrifugation, for example, as described in cross referenced U.S. Pat. No. 6,114,179. A quantity of the diluted patient sample is then aspirated from at least one of the diluent chambers and added to a test chamber 68 of the test card 60. Alternatively, a predetermined amount of diluent can be contained in one of the diluent wells 70, 72. A portion of the precontained diluent can be aspirated from the well and added to the remaining adjacent diluent chamber for mixing with the patient sample, which is also aspirated by known means. The mixed sample can then be aspirated from the mixing well and added to the test chamber 68. Each of the remaining test chambers 68 similarly receive a quantity of diluted patient sample from at least one of the diluent chambers. The contents of the test chambers 68 are then incubated and centrifuged in order to mix the contents sufficiently to produce a column agglutination reaction, such as those shown in FIG. 1, which can be graded. No separate dilution cup or separate consumable is required and following testing, the test card 60 can be removed from the apparatus for disposal.

Figure 4:
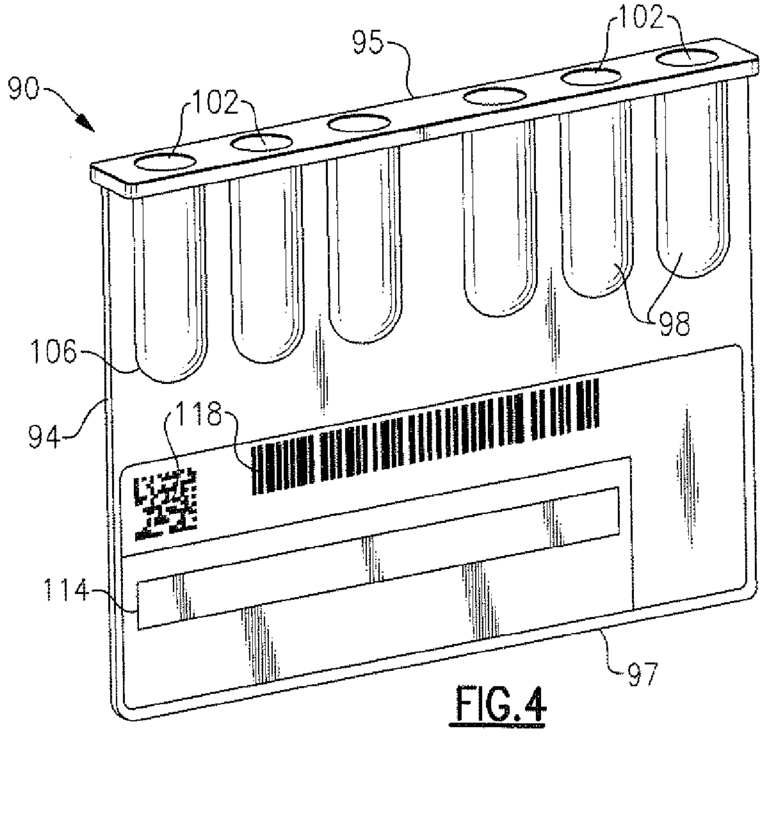
FIG. 4 is a front perspective view of an immunodiagnostic test card made in accordance with a second embodiment.

Referring to FIG. 4, an immunodiagnostic test card 90 according to a second embodiment is provided. As in the preceding, the immunodiagnostic test card 90 is defined by a substantially flat planar member 94 having respective top and bottom sides 95, 97. The planar member 94 is preferably made from a moldable plastic such as PVC, polyethylene or polystyrene, which includes a plurality of integral vertical columns or wells 98 that are arranged in parallel spaced relation. As in the preceding, each well 98 includes an open upper end 102 and a closed lower end 106 defined by a substantially cylindrical structure that permits a volume of liquid to be contained therein. The wells 98 can be glued or welded to the planar member 94, or as in the present embodiment can be molded therefrom. In this specific embodiment, no patient sample test chambers are provided and the test card 90 only contains the dilution wells 98. In an alternative version, the planar member can releasably receive separate dilution chambers (not shown) wherein the planar member can include a plurality of spaced tabs (not shown) that biasedly spring inwardly. The tabs, as used in this alternative approach, capture and retain a corresponding plurality of cylindrical wells attached thereto in releasable snap-fitting engagement. Other attachment means can, however, be utilized such that the chambers are supported by the substrate.

According to one version and whether the dilution wells are separably attached or are integrally provided to a framed structure, the wells can initially be prefilled with a predetermined amount of diluent, such as a buffer solution, wherein the card would include a pierceable foil or thin film seal to cover the top of each well 98. Alternatively, a vapor barrier could be used in lieu of a foil seal to allow packaging of lyophilized reagents. According to this illustrated embodiment, however, each of the wells 98 are initially empty and therefore no pierceable seal is required.

Referring to FIGS. 2-4, each of the herein described immunodiagnostic test cards further includes a label 114. The label 114 can include visually perceivable information in order to identify the card, the card format and card type, as well as the expiration date to a reader of the diagnostic apparatus. As shown herein, the label further includes at least one bar coded or other machine symbol coded section 118, indicating all or portions of the label information or other information. The section(s) 118 can include other machine symbology such as, for example, those recognizable by optical character recognition (OCR).

In operation, the herein described immunodiagnostic test cards 90 are used in conjunction with an automated diagnostic apparatus, such as, for example, the afore referred to ProVue® analyzer system manufactured by Ortho-Clinical Diagnostics, Inc. A plurality of immunodiagnostic test cards can be loaded or already provided by a cartridge (not shown) for automated handling. In the instance in which a test card according to the first embodiment is utilized, the card is initially loaded into the apparatus within the cartridge and the card is identified by the reader (not shown) for the type of testing that is required by scanning the label 114 and encoded section(s) 118, FIG. 4. The seal (not shown) at the top 95 of the test card 90 is pierced by the apparatus, in a manner that is known, and a predetermined quantity of diluent is added to the contents of the columns or wells 98 defining each dilution chamber. Patient sample is then also added to the diluent chamber for mixing, such as through centrifugation. Following mixing of the contents, the diluted patient sample is aspirated from the dilution chamber and is then dispensed through pipetting or other means into one of the test chambers 18 of a test card 10, FIG. 1. Additional diluent/patient sample mixes can be used in conjunction with the test chambers that are available on the test card 10. As is apparent from the discussion, no additional dilution cups or plates are required. Following testing, each test card 10, 90 is disposed of in a manner already known to those using so-called "gel" or "bead" cards.

PARTS LIST FOR FIGS. 1-4

10 immunodiagnostic test card
14 flat planar member
18 microtubes, plurality
22 column
24 top side, card
25 bottom side, card
26 open upper cylindrical section
28 closed lower cylindrical section
60 immunodiagnostic test card
64 flat planar member
66 top side, card
67 bottom side, card
68 test chambers
70 dilution chamber

71 upper open cylindrical section
72 dilution chamber
73 lower closed cylindrical section
76 open upper end
80 closed lower end
90 immunodiagnostic test card
94 flat planar member
95 top side
97 bottom side
98 columns
102 open upper end
106 closed lower end
114 label
118 machine coded sections It will be readily apparent that other variations and modifications are possible within the intended ambits of the concepts presented. For example and in lieu of patient sample, reagent or other fluid that requires dilution can be used. To that end, the inventive concepts described herein are as defined by the following claims.

The invention claimed is:

1. An immunodiagnostic test card for use in an immunodiagnostic testing apparatus, said test card comprising:

a substantially flat planar substrate;

a plurality of vertically disposed chambers supported within an upper end of said substantially flat substrate, said plurality of chambers including a linear array of reaction chambers, each said reaction chamber initially containing a quantity of a test material capable of producing an agglutination reaction when a patient sample is added and mixed therewith in said testing apparatus; and said plurality of vertically disposed chambers further including a plurality of dilution chambers supported in the upper end of said substrate, said plurality of dilution chambers including at least one pair of dilution chambers disposed in side by side relation between at least one pair of adjacent reaction chambers.

2. A test card as recited in claim 1, wherein at least one said dilution chamber is pre-filled with a volumetric quantity of diluent.

3. A test card as recited in claim 1, wherein at least one said dilution chamber is empty prior to use of said test card.

4. A test card as recited in claim 1, wherein said at least one reaction chamber is covered by a pierecable seal.

5. A test card as recited in claim 4, wherein said seal is a vapor barrier.

6. A test card as recited in claim 1, wherein said card is disposable.

7. A method for diluting a patient sample prior to immunodiagnostic testing of said sample, said method comprising the steps of:

providing at least one pair of dilution chambers in an immunodiagnostic test card, said card including a substantially flat planar member in which said at least one pair of dilution chambers is supported by said substantially flat planar support in relation to a linear array of reaction chambers, each said reaction chamber being pre-filled with a volumetric quantity of a test material and said at least one pair of dilution chambers being disposed in side by side relation between at least one pair of said reaction chambers;

adding patient sample to said at least one dilution chamber of said at least one pair of dilution chambers;

mixing said patient sample and diluent; and withdrawing the diluted patient sample from said dilution chamber and adding the diluted patient sample to at least one said reaction chamber for testing thereof.

8. A method as recited in claim 7, wherein said test card is disposable.

9. A method as recited in claim 7, wherein said test card is an immunohematology test card.

10. A method as recited in claim 7, including the additional steps of adding diluent to one dilution chamber of said pair of dilution chambers, adding patient sample to the other of said pair of dilution chambers which is initially empty, withdrawing a quantity of diluent from said dilution chamber having diluents and adding said quantity of diluent to the patient sample.

11. A test card as recited in claim 1, wherein the total length dimension of said pair by side dilution chambers is substantially equal to the maximum outer diameter of a reaction chamber of said test card, enabling said reaction chambers and said dilution chambers to fit within the linear array of chambers of said test card.

* * * * *